United States Patent
Asai

(10) Patent No.: US 9,699,720 B2
(45) Date of Patent: Jul. 4, 2017

(54) COMMUNICATION CHANNEL SELECTION AND COMMUNICATION DEVICE MANAGEMENT

(71) Applicant: Norihiko Asai, Tajimi (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 704 days.

(21) Appl. No.: 14/159,061

(22) Filed: Jan. 20, 2014

(65) Prior Publication Data

US 2014/0208221 A1   Jul. 24, 2014

(30) Foreign Application Priority Data

Jan. 21, 2013   (JP) .................................. 2013-008333

(51) Int. Cl.

| | | |
|---|---|---|
| *G06F 3/0482* | (2013.01) | |
| *H04W 48/20* | (2009.01) | |
| *H04W 8/00* | (2009.01) | |
| *H04L 29/08* | (2006.01) | |
| *G06F 3/12* | (2006.01) | |

(52) U.S. Cl.
CPC ............. *H04W 48/20* (2013.01); *H04L 67/14* (2013.01); *H04L 67/16* (2013.01); *H04W 8/005* (2013.01);

(Continued)

(58) Field of Classification Search
CPC . G06F 3/00; G06F 3/041; G06F 3/048; G06F 3/0481; G06F 3/0482; G06F 3/0484; G06F 3/0488; G06F 3/04842; G06F 13/00; G06F 15/00; G06F 17/00; G04W 4/00; G04W 36/36; G04W 48/00; G04W 48/18; G04W 48/20; G04W 84/10; G04W 84/12;

(Continued)

(56) References Cited

U.S. PATENT DOCUMENTS 8,412,267 B2   4/2013   Miyata
8,713,635 B2   4/2014   Iga (Continued)

FOREIGN PATENT DOCUMENTS

JP   2007-227999 A   9/2007
JP   2011-070678 A   4/2011

(Continued)

OTHER PUBLICATIONS

Nov. 17, 2015—(JP) Notice of Reasons for Rejection—App 2013-008333.

*Primary Examiner* — Xiomar L Bautista
(74) *Attorney, Agent, or Firm* — Banner & Witcoff, Ltd.

(57) ABSTRACT

Communication using a communication device may be configured using a variety of options and processes. In one example, communication channels may be selected or otherwise designated. Depending on whether a communication channel has been previous selected or designated, differing processes and options may be provided to a user, thereby facilitating communication configuration. The processes and options may also differ depending on whether a communication channel is currently activated. Moreover, in some examples, if a device has not been previously selected as a communication destination, the communication configuration and process may provide an option to select a destination device.

11 Claims, 11 Drawing Sheets

(52) U.S. Cl.
CPC .......... *G06F 3/1204* (2013.01); *G06F 3/1226* (2013.01); *G06F 3/1236* (2013.01); *G06F 3/1292* (2013.01)

(58) Field of Classification Search
CPC ..... G04W 88/00; G04W 88/02; G04W 88/06; G04W 92/00; G04M 1/00; G04M 3/42; G04L 9/32; G04L 29/06; G04L 67/02; G04B 5/06; G04B 7/06; G04B 7/22; G04B 7/26
See application file for complete search history.

(56) References Cited

U.S. PATENT DOCUMENTS

| | | | | |
|---|---|---|---|---|
| 2005/0259647 | A1* | 11/2005 | Wakumoto | H04L 45/00 370/389 |
| 2006/0274750 | A1* | 12/2006 | Babbar | H04L 45/306 370/390 |
| 2008/0052754 | A1 | 2/2008 | Iga | |
| 2011/0141293 | A1* | 6/2011 | Yoneyama | H04N 1/00283 348/207.1 |
| 2011/0177780 | A1 | 7/2011 | Sato et al. | |
| 2012/0021801 | A1* | 1/2012 | Miyata | H04W 4/00 455/552.1 |
| 2012/0026538 | A1* | 2/2012 | Miyata | H04L 67/04 358/1.15 |
| 2013/0208696 | A1* | 8/2013 | Garcia Martin | H04W 36/32 370/331 |
| 2015/0172968 | A1* | 6/2015 | Lund | H04W 36/0066 455/411 |

FOREIGN PATENT DOCUMENTS

| | | |
|---|---|---|
| JP | 2011-146991 A | 7/2011 |
| JP | 2012-029148 A | 2/2012 |

* cited by examiner

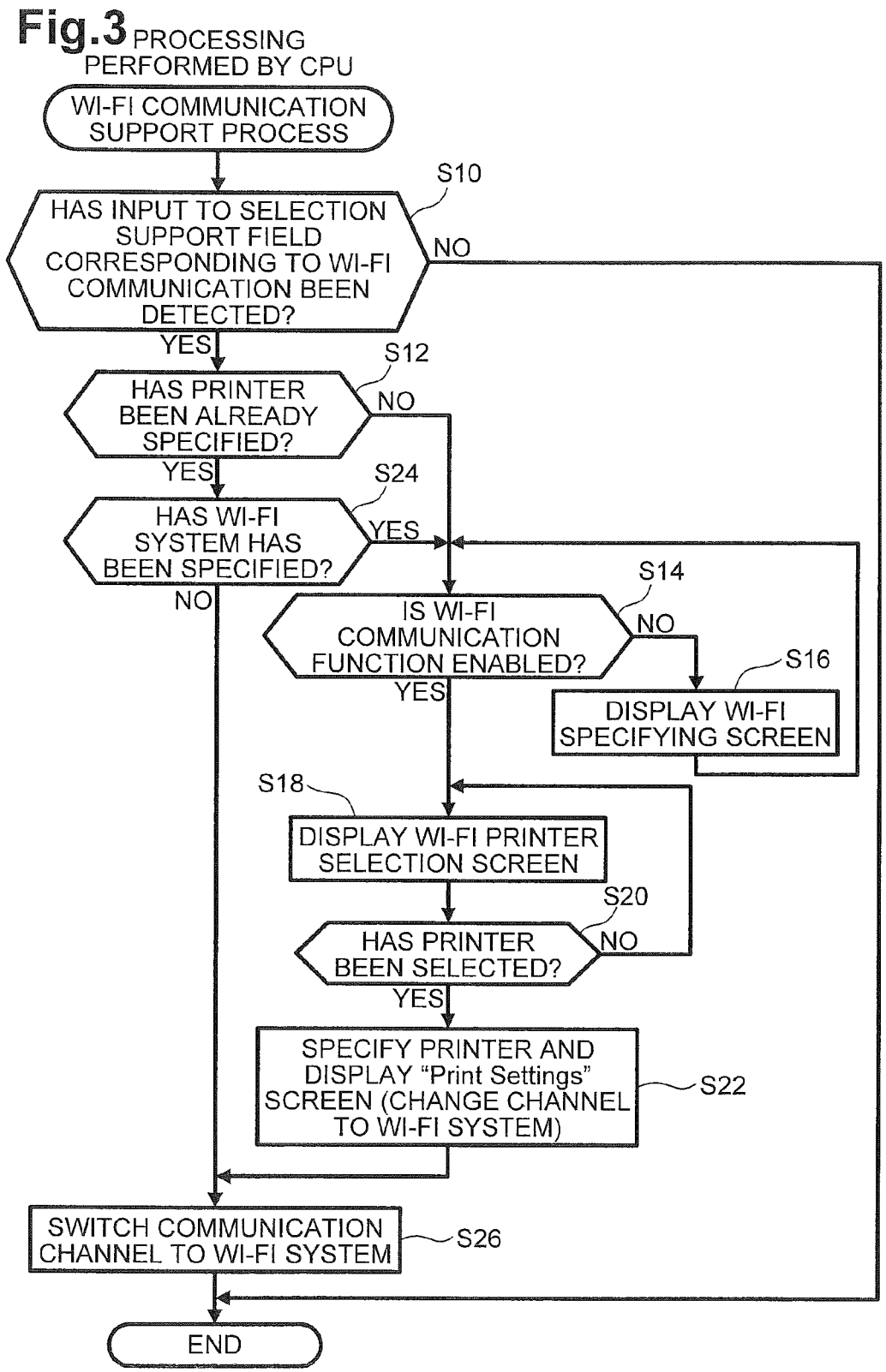

Fig.4A

Print Settings — 30
WiFi Printer
No Device Selected
Bluetooth Printer
No Device Selected — 32
34

WHEN WI-FI IS DISABLED ⇦ ⇨ WHEN WI-FI IS ENABLED

Fig.4B

WiFi Printer
WiFi P-1 — 36a
WiFi P-2 — 36b
WiFi P-3 — 36c
34

Fig.4C

Print Settings — 30
WiFi Printer
WiFi P-2
Bluetooth Printer
No Device Selected — 32

Fig.4D

WiFi Printer
WiFi is OFF
Do you want to enable Wi-Fi communication function?
No    Yes
34

「No」  「Yes」

Fig.4E

WiFi Settings
WiFi
40
34

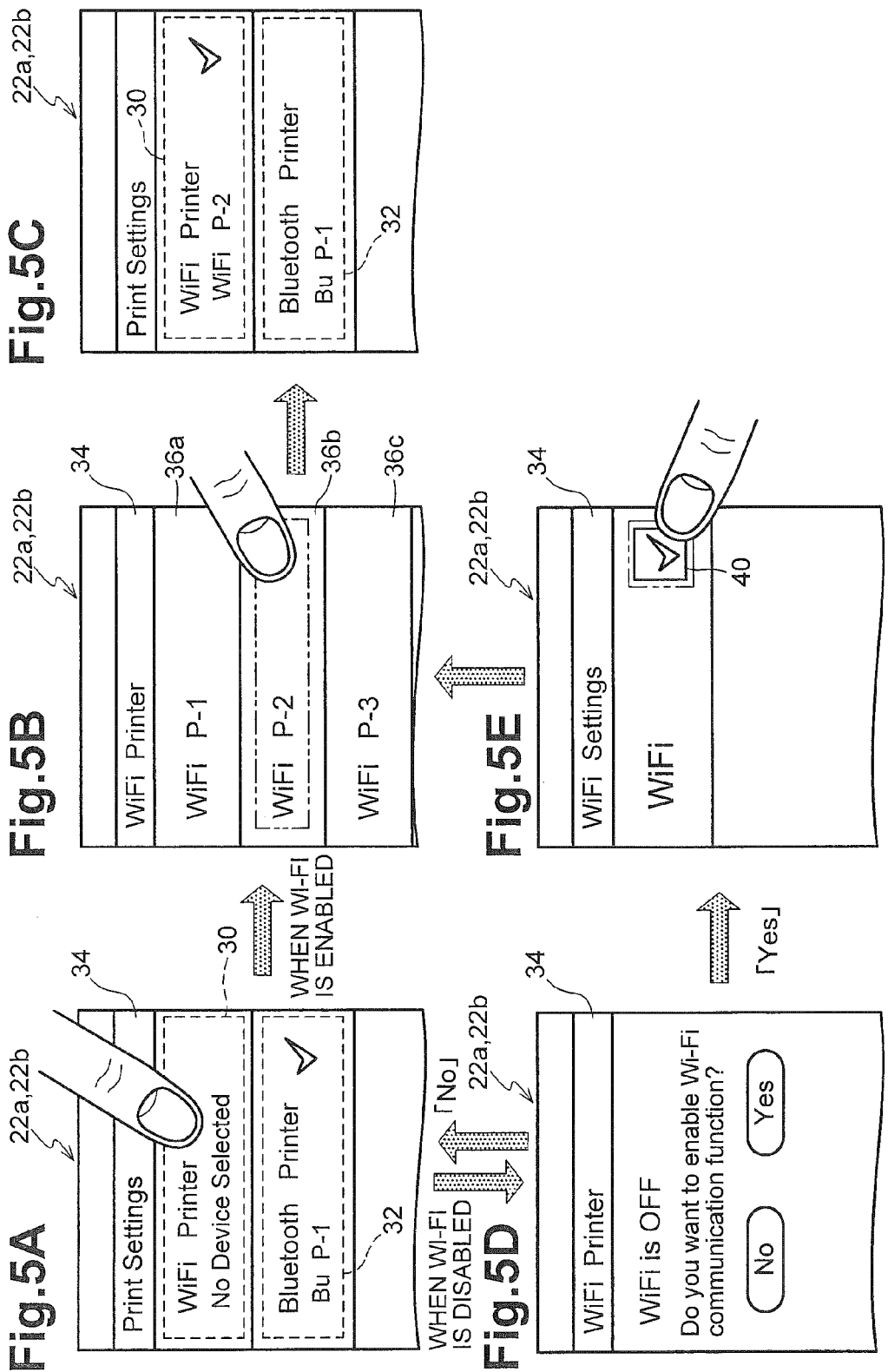

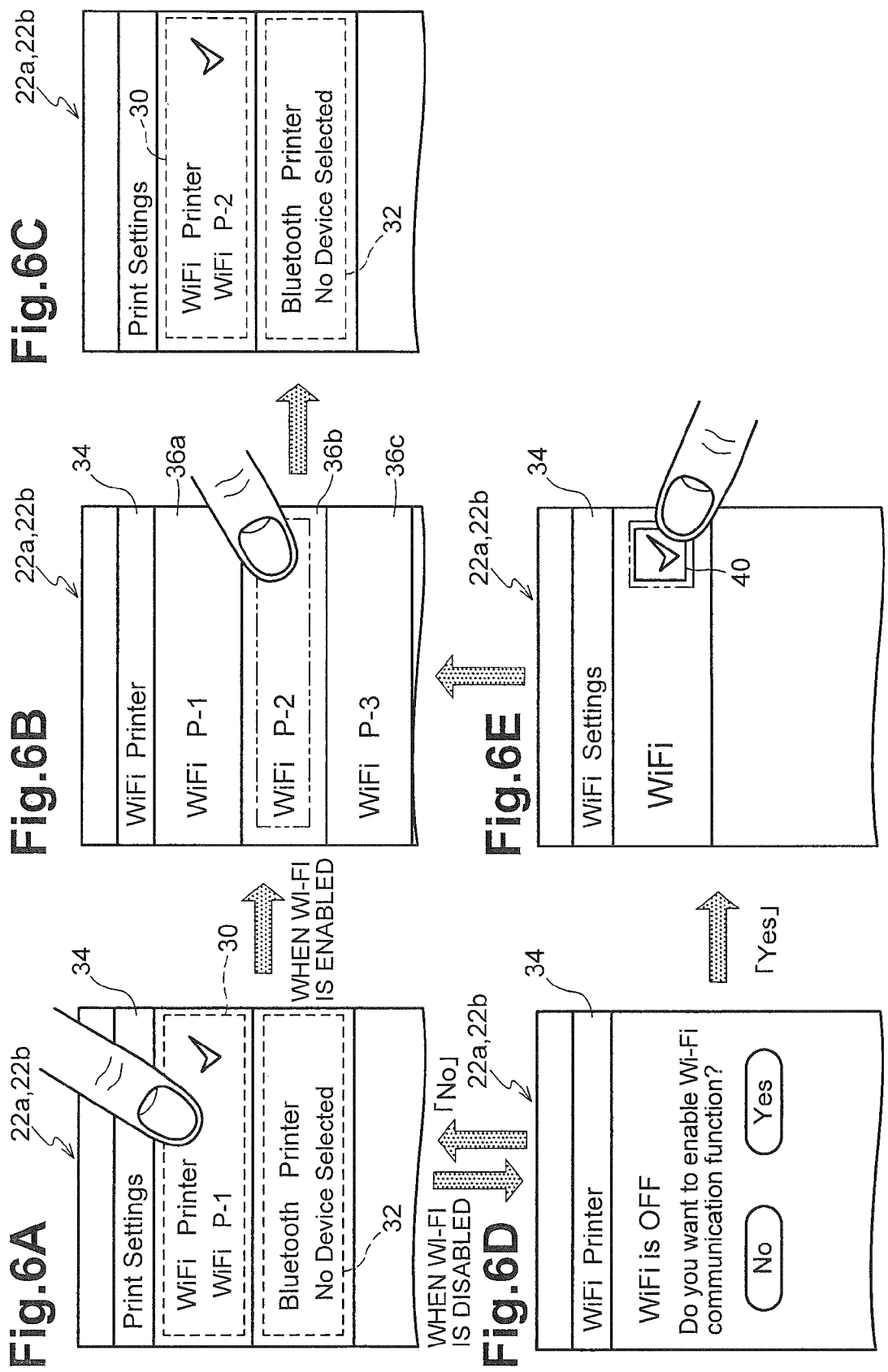

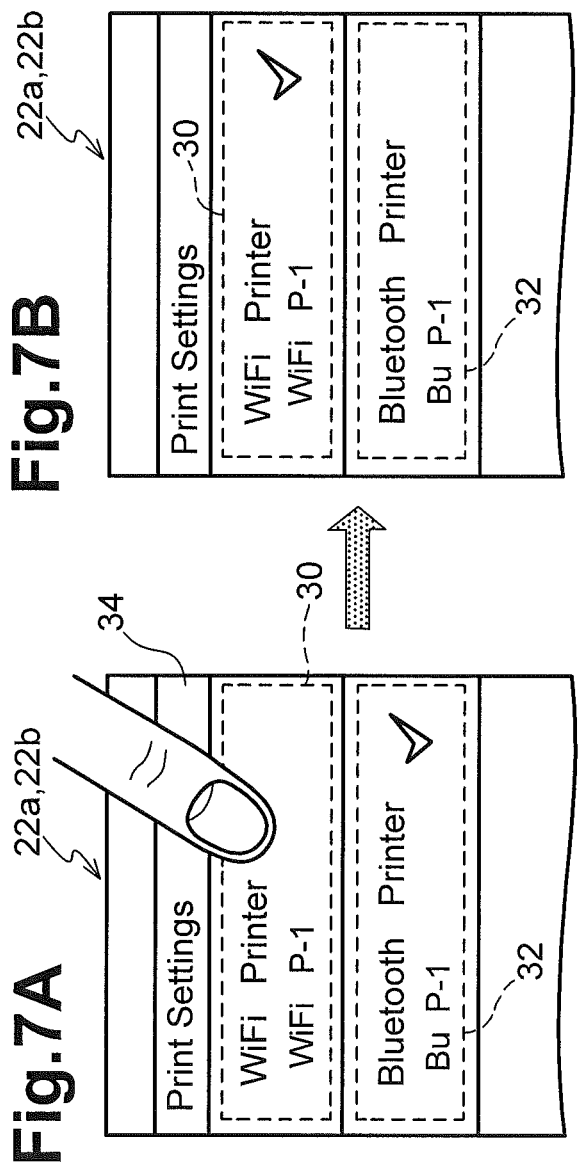

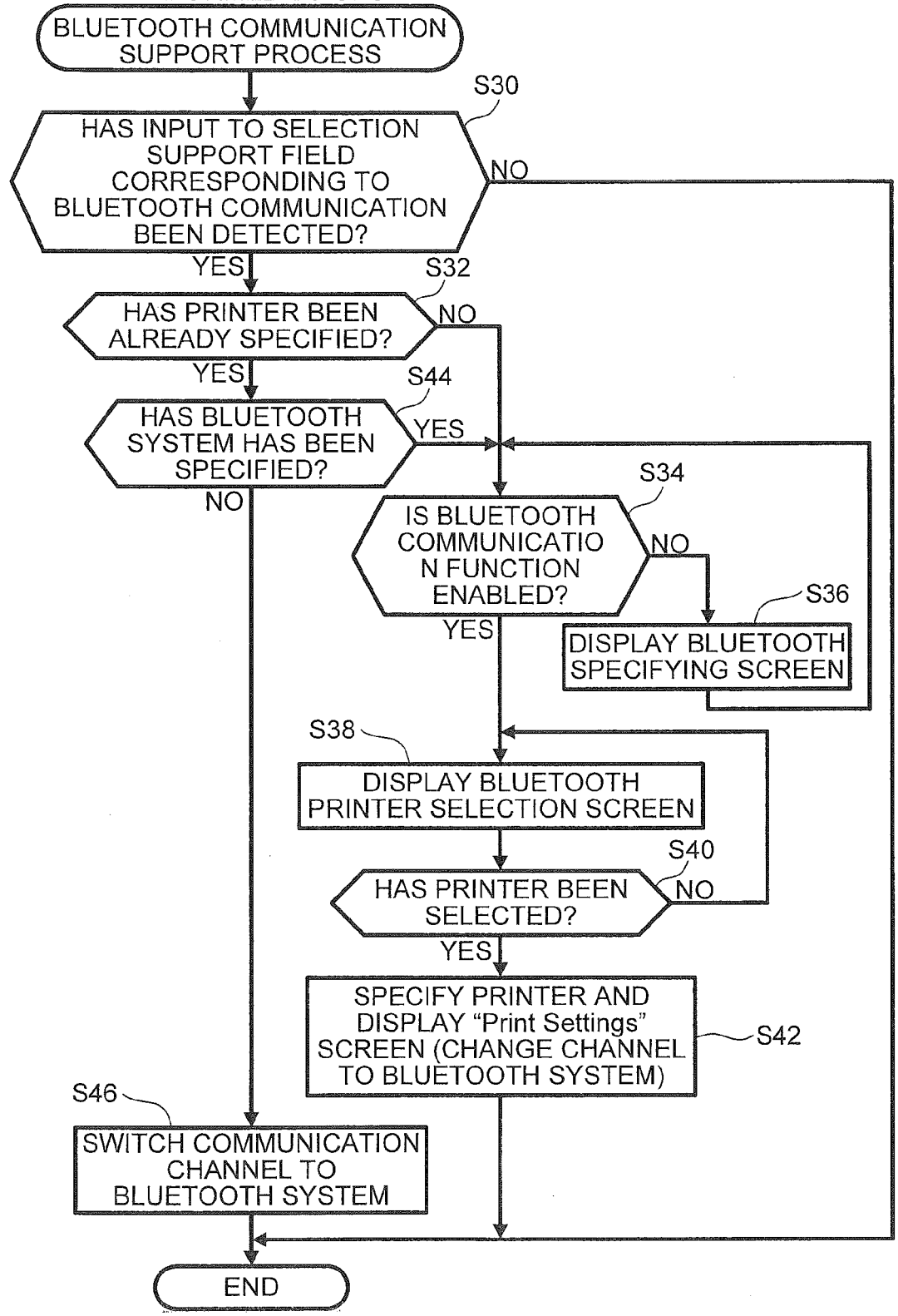

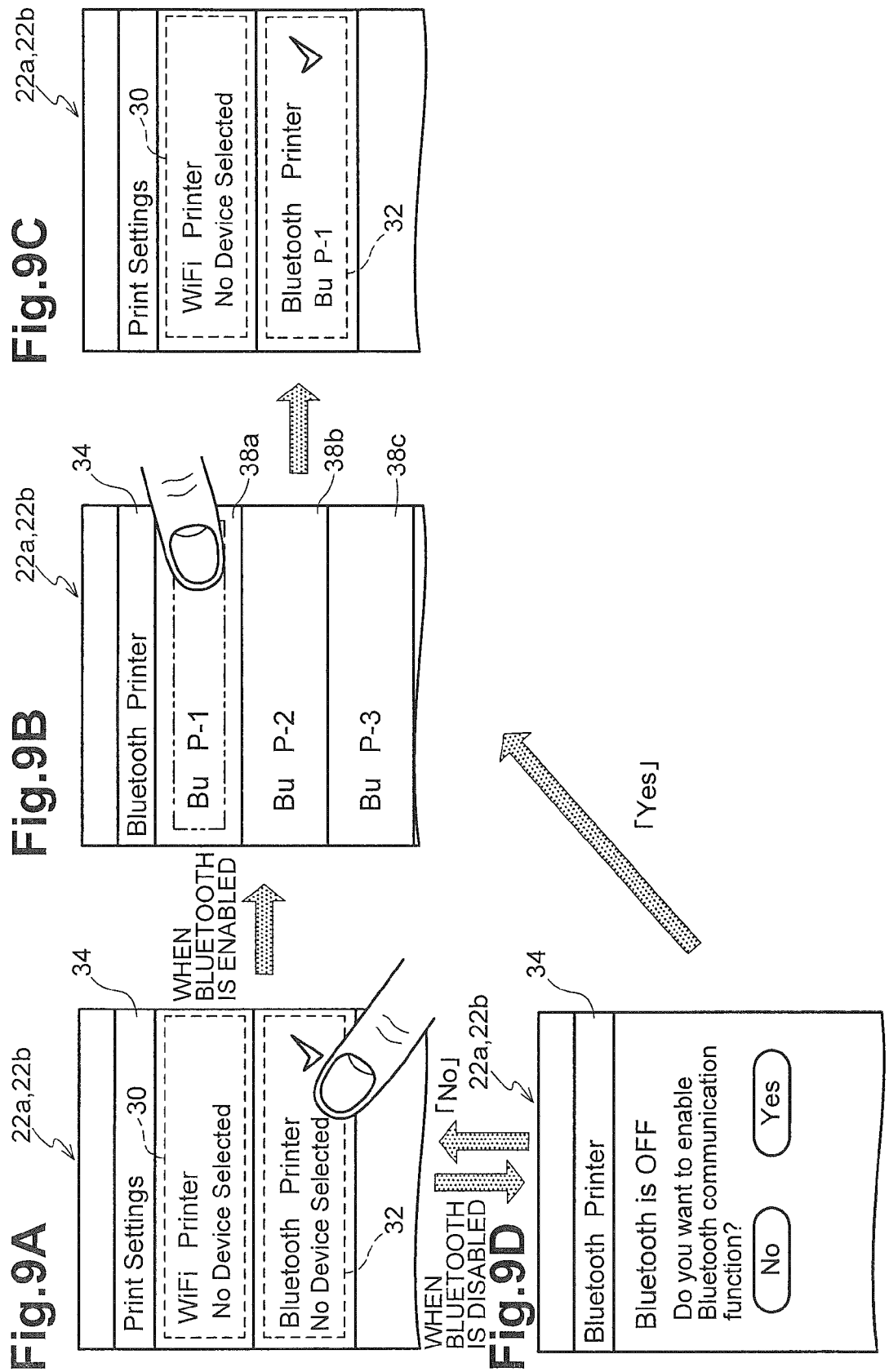

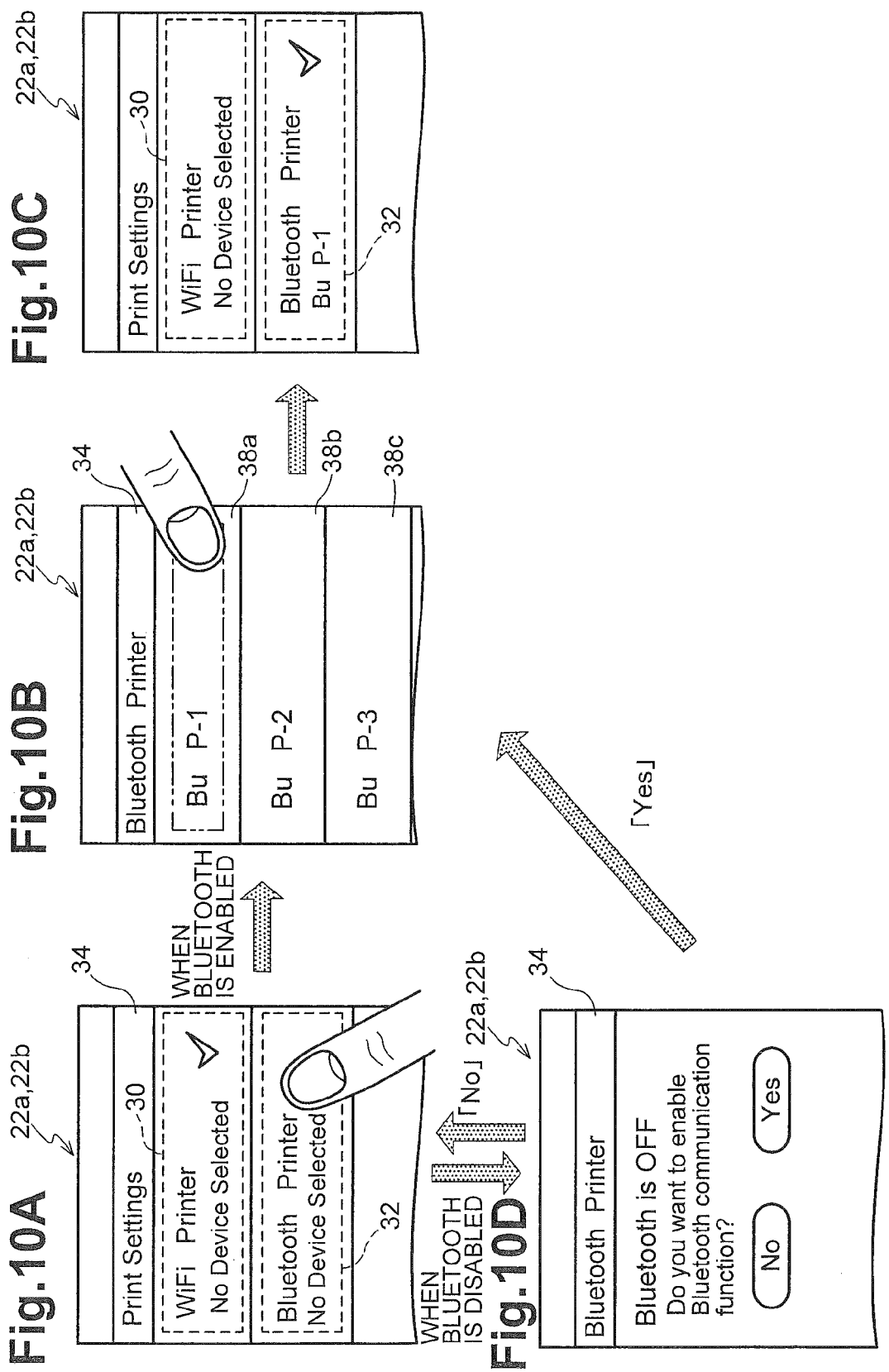

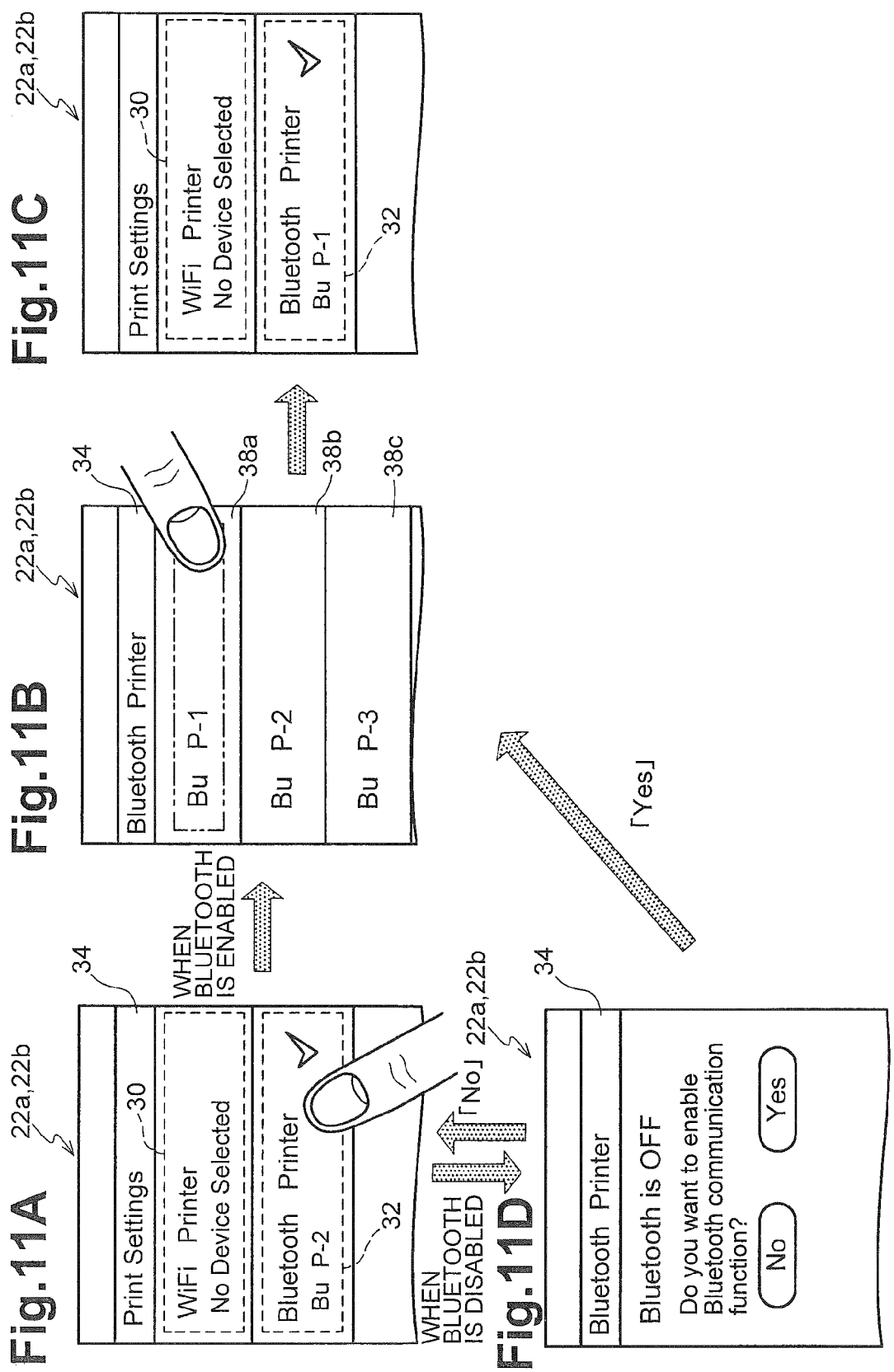

COMMUNICATION CHANNEL SELECTION AND COMMUNICATION DEVICE MANAGEMENT

CROSS-REFERENCE TO RELATED APPLICATION

This application claims priority from Japanese Patent Application No. 2013-008333, filed on Jan. 21, 2013, which is incorporated herein by reference in its entirety.

FIELD OF DISCLOSURE

Aspects described herein relate to a computer-readable storage medium storing a communication support program for a communication device.

BACKGROUND

There has been known a mobile telephone device that is allowed to perform communication with an external device via the Bluetooth® system (Bluetooth® is a registered trademark owned by BLUETOOTH SIG. INC. of Kirkland, Wash.) and a wireless local area network ("LAN"), selectively.

SUMMARY

In order to perform communication with an external device using a device that may be allowed to use a plurality of communication channels, a user may be required to perform an input operation for selecting a communication channel and another input operation for specifying a communication target device to be communicated using the selected communication channel. Accordingly, such a process may be cumbersome.

Aspects described herein provide a computer-readable storage medium storing a communication support program and a communication device that may facilitate a user's input operation required to perform communication with an external device.

According to one or more aspects, different interfaces and options may be provided to the user depending on whether a communication channel has been previously selected and/or whether a particular device with which to communicate using a communication channel has been previously selected. Additionally or alternatively, various options and process may be provided and/or preformed depending on whether the communication channel has been activated.

DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 3 is a flowchart depicting an example Wi-Fi® communication support process in the illustrative embodiment according to one or more aspects of the disclosure.

FIGS. 4A, 4B, 4C, 4D, and 4E are state diagrams depicting a transition of states of the display screen in response to a touch to a Wi-Fi® selection support field when a printer has not been specified yet in the illustrative embodiment according to one or more aspects of the disclosure.

FIGS. 5A, 5B, 5C, 5D, and 5E are state diagrams depicting a transition of states of the display screen in response to a touch to the Wi-Fi® selection support field when a printer has not been specified yet in the illustrative embodiment according to one or more aspects of the disclosure.

FIGS. 6A, 6B, 6C, 6D, and 6E are state diagrams depicting a transition of states of the display screen in response to a touch to the Wi-Fi® selection support field when a printer has been specified in the illustrative embodiment according to one or more aspects of the disclosure.

FIGS. 7A and 7B are state diagrams depicting a transition of states of the display screen in response to a touch to the Wi-Fi® selection support field when a printer has been specified in the illustrative embodiment according to one or more aspects of the disclosure.

FIG. 8 is a flowchart depicting an example Bluetooth® communication support process in the illustrative embodiment according to one or more aspects of the disclosure.

FIGS. 9A, 9B, 9C, and 9D are state diagrams depicting a transition of states of the display screen in response to a touch to a Bluetooth® selection support field when a printer has not been specified yet in the illustrative embodiment according to one or more aspects of the disclosure.

FIGS. 10A, 10B, 10C, and 10D are state diagrams depicting a transition of states of the display screen in response to a touch to the Bluetooth® selection support field when a printer has not been specified yet in the illustrative embodiment according to one or more aspects of the disclosure.

FIGS. 11A, 11B, 11C, and 11D are state diagrams depicting a transition of states of the display screen in response to a touch to a Bluetooth® selection support field when a printer has been specified in the illustrative embodiment according to one or more aspects of the disclosure.

DETAILED DESCRIPTION

Hereinafter, an illustrative embodiment according to the disclosure is described with reference to the accompanying drawings.

Figure 1:
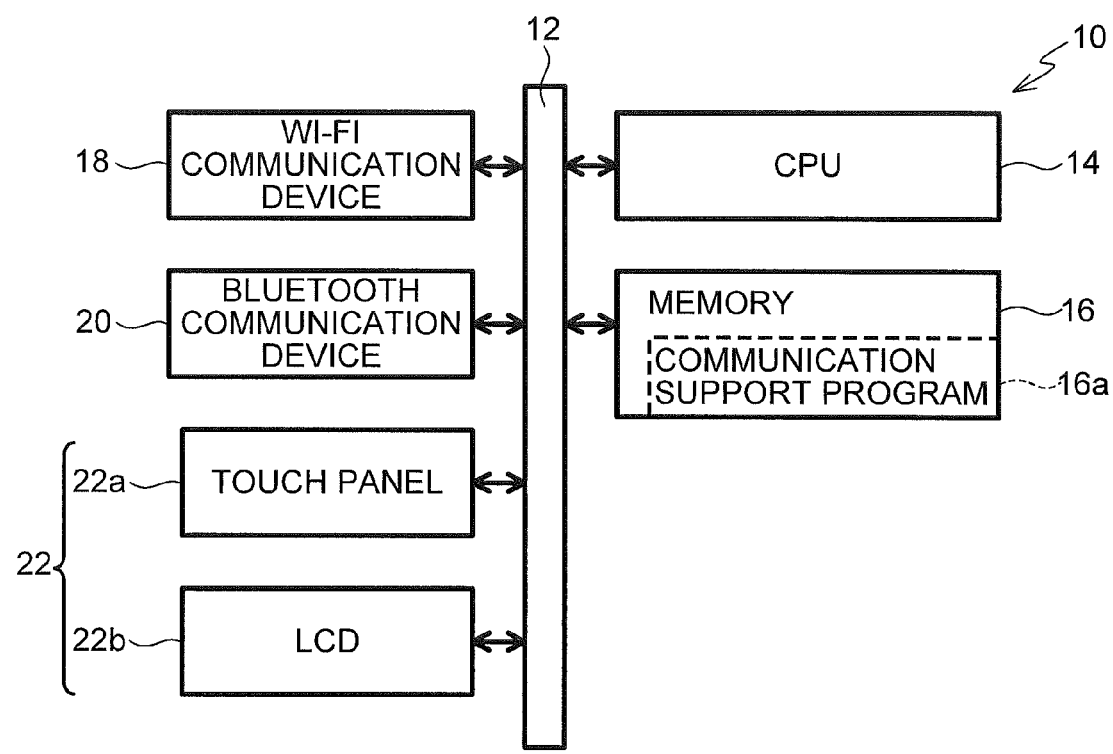
FIG. 1 is a diagram depicting a system configuration in an illustrative embodiment according to one or more aspects of the disclosure.

FIG. 1 depicts a configuration of a mobile telephone device 10 as a communication device according to the first illustrative embodiment. In the mobile telephone device 10, a central processing unit ("CPU") 14, a memory 16A Wi-Fi® communication device 18, a Bluetooth® communication device 18, and a user interface 22 may be connected with each other via an input and output port 12 and may be allowed to perform communication with each other. The CPU 14 may be configured to execute a program (e.g., computer readable instructions) stored in the memory 16 that may be a nonvolatile memory. The memory 16 may store various setting values used for communication via the Wi-Fi® communication device 18 or for communication via the Bluetooth® communication device 18 as well as an operating system ("OS") and various programs. The Wi-Fi® communication device 18 may be an interface for performing wireless communication in compliance with a Wireless Fidelity ("Wi-Fi®") standard (Wi-Fi® is a registered certification mark owned by the Wi-Fi Alliance of Austin, Tex.). Hereinafter, wireless communication performed in compliance with the Wi-Fi® standard may be referred to as "communication using the Wi-Fi® system" or "Wi-Fi® communication". The Bluetooth® communication device 18 may be an interface for performing wireless communication in compliance with a Bluetooth® standard. Hereinafter, wireless communication performed in compliance with the Bluetooth® standard may be referred to as "communication using the Bluetooth® system" or "Bluetooth® communication". The mobile telephone device 10 may comprise, as the user interface 22, a liquid crystal display ("LCD") 22b and a touch panel 22a for accepting a user's input. In the illustrative embodiment, the user interface 22 may be configured with the LCD 22b and the touch panel 22a placed on top of the LCD 22b. The touch panel 22a may be configured to detect a contact or proximity of an instruction device, for example, a finger or a stylus, to the touch panel 22a.

Communication using the Wi-Fi® system and communication using the Bluetooth® system may be available for the mobile telephone device 10 to perform communication with an external device, for example, a printer. In some examples, the mobile telephone device 10 may be allowed to perform communication with a plurality of external printers (not depicted). Each of the plurality of external printers may be allowed to perform communication using one of the Wi-Fi® system and the Bluetooth® system and may perform communication with the mobile telephone device 10 via the one of the Wi-Fi® system and the Bluetooth® system.

In the illustrative embodiment, a communication support program 16A as an application program may be stored in the memory 16 to facilitate input operations to the touch panel 22a when a communication method is selected from the Wi-Fi® system and the Bluetooth® system and when a printer targeted for communication using the selected communication method is selected. In the illustrative embodiment, there may be two communication channels, for example, a communication channel for accessing a printer via communication using the Wi-Fi® system and a communication channel for accessing a printer via communication using the Bluetooth® system. In other words, selecting Wi-Fi® communication may mean selecting the communication channel for accessing a printer via communication using the Wi-Fi® system, and selecting Bluetooth® communication may mean selecting the communication channel for accessing a printer via communication using the Bluetooth® system.

Figure 2:
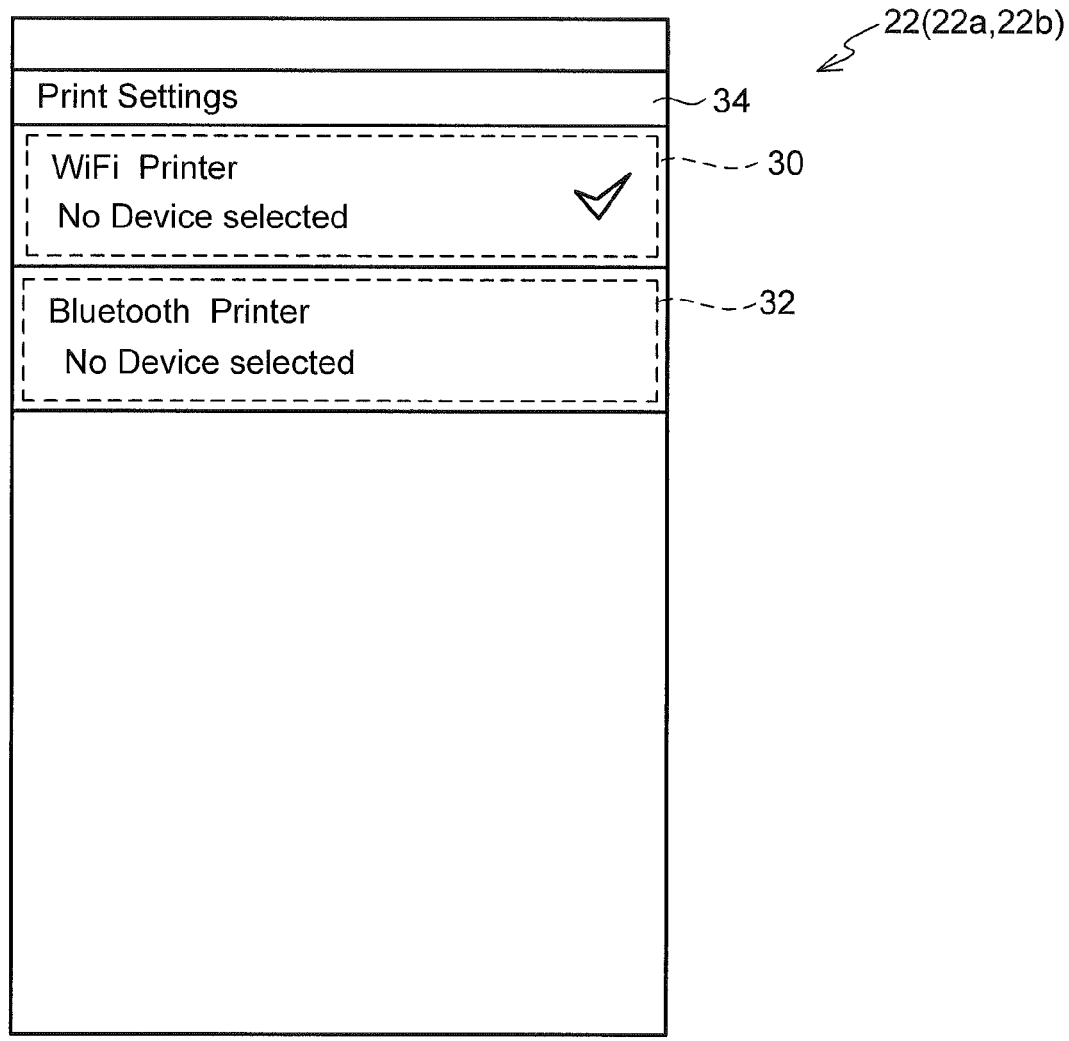
FIG. 2 illustrates a display screen displayed on a liquid crystal display in the illustrative embodiment according to one or more aspects of the disclosure.

FIG. 2 illustrates an example of display screens (e.g., user interfaces) that may be generated and displayed on the LCD 22b, particularly, an example selection screen for selecting a communication channel from communication with a printer using the Wi-Fi® system and communication with a printer using the Bluetooth® system. In a title display field 34, for example, "Print Settings" may be indicated as a title of the selection screen. In the illustrative embodiment, a field corresponding to communication using the Wi-Fi® system (e.g., a selection support field 30), and a field corresponding to communication using the Bluetooth® system (e.g., a selection support field 32) may be listed. The selection screen depicted in FIG. 2 may be generated and displayed by the CPU 14 executing the communication support program 16A stored in the memory 16.

In some arrangements, a mark may always be put on a rightward portion of one of the selection support fields 30 and 32. FIG. 2 illustrates an example display screen in a case where a mark has been put on the selection support field 30 when Wi-Fi® communication is selected and used. The mark may be an indication that the communication channel has been selected as the channel to be used for communication. For example, as the communication support program 16A is installed on the mobile telephone device 10, the Wi-Fi® system may be specified as the channel to be used for communication by the mobile telephone device 10 as an initial setting.

In each of the selection support fields 30 and 32, a field, in which an indication, for example, the message "No Device selected", may be displayed, may be used to display a name of a printer specified as a communication target. When a printer as a communication target has not been specified yet, the indication representing that a communication-target printer has not been specified yet, for example, the message "No Device selected", may be displayed in this field. In FIG. 2, an indication for a case where any of a communication-target printer configured to perform communication via Wi-Fi® communication (hereinafter, referred to as a "Wi-Fi® printer") and a communication-target printer configured to perform communication via Bluetooth® communication (hereinafter, referred to as a "Bluetooth® printer") has been specified, may be displayed.

Hereinafter, a function for facilitating the selection or specification of a communication channel for communication with a printer through an input operation to the touch panel 22a is described. The function may be a part of the communication support program 16A.

FIG. 3 depicts a procedure of a Wi-Fi® communication support process according to the illustrative embodiment. The Wi-Fi® communication support process may be implemented such that the communication support program 16A stored in the memory 16 may be repeatedly performed by the CPU 14, for example, continuously or at predetermined intervals.

In step S10, the CPU 14 may determine whether an input to the selection support field 30 corresponding to Wi-Fi® communication has been detected. The input to the selection support field 30 may be implemented by a user's input operation, for example, a touch to the selection support field 30. When the CPU 14 determines that an input to the selection support field 30 corresponding to Wi-Fi® communication has been detected (e.g., YES in step S10), the routine may proceed to step S12. Then, the CPU 14 may determine whether a Wi-Fi® printer to be used for communication with the mobile telephone device 10 has already been specified (e.g., in step S12). When the CPU 14 determines that a Wi-Fi® printer to be used for communication with the mobile telephone device 10 has not been specified yet (e.g., NO in step S12), the CPU 14 may determine whether a communication function using the Wi-Fi® system (hereinafter, also referred to as a "Wi-Fi® communication function") is enabled (e.g., step S14). For example, when the power of the Wi-Fi® communication device 18 is on or when the Wi-Fi® communication device 18 has been recognized, by the OS that may be executed by the CPU 14, as a communication device to be used, the Wi-Fi® communication function is enabled. When the CPU 14 determines that the Wi-Fi® communication function is not enabled (e.g., NO in step S14), the CPU 14 may display, on the LCD 22b, a Wi-Fi® specifying screen for enabling the Wi-Fi® communication function (e.g., in step S16).

The process described above with respect to FIG. 3 is illustrated by way of example interfaces shown in FIGS. 4A and 4D. For example, when the Wi-Fi® communication function is disabled at the time of the selection of the selection support field 30 as depicted in FIG. 4A, the screen may be switched to the Wi-Fi® specifying screen depicted in FIG. 4D to prompt the user to enable the Wi-Fi® communication function. In response to the switch to the screen of FIG. 4D, the user may operate the touch panel 22a in accordance with guidance displayed on the Wi-Fi® specifying screen to enable the Wi-Fi® communication function (see FIG. 4E). In FIG. 4E, an execution button field 40 configured to receive an input operation for instructing a change of the status of the Wi-Fi® communication function from being disabled to being enabled may be displayed on the LCD 22b.

As depicted in FIG. 3, after the CPU 14 displays the Wi-Fi® specifying screen, the CPU 14 may wait until the Wi-Fi® communication function becomes enabled by the user's operation. For example, the user's operation may include instructing the performance of communication using the Wi-Fi® system through processing in steps S14 and S16. When the CPU 14 determines that the Wi-Fi® communication function has become enabled by the user's operation (e.g., YES in step S14), the routine may proceed to step S18.

The CPU 14 may display a Wi-Fi® printer selection screen (e.g., in step S18). As depicted in FIG. 4B, the CPU 14 may display, on the LCD 22b, Wi-Fi® printer fields 36A, 36B, and 36C corresponding to communicable Wi-Fi® printers, respectively. The Wi-Fi® printer selection screen may be displayed through the switching of the screen from the screen depicted in FIG. 4A. Therefore, another title, for example, "Wi-Fi® Printer", may be displayed in the title display field 34 to indicate that the Wi-Fi® printer selection screen may be a different screen. When the user performs an input operation for selecting one of the Wi-Fi® printer fields 36A, 36B, and 36C under this state, the CPU 14 may determine that a printer has been selected (e.g., YES in step S20) and the routine may proceed to step S22. The CPU 14 may specify the selected printer as the communication-target printer to be used for communication using the Wi-Fi® system and display the "Print Settings" screen as depicted in FIG. 4C (e.g., step S22).

FIG. 4A illustrates a situation in which no printer has yet been specified. Therefore, the indication representing that a Wi-Fi® printer has not been specified yet, for example, a message "No Device selected", may be displayed in the selection support field 30. In FIG. 4C, when a printer has been specified, the name of the specified Wi-Fi® printer (e.g., "Wi-Fi® P-2") may be displayed.

As depicted in FIG. 5A, when the Bluetooth® system has been specified as the communication channel for communication with the printer at the time of the selection of the selection support field 30 corresponding to Wi-Fi® communication, in step S22, the CPU 14 may specify the selected Wi-Fi® printer as the communication-target printer and then switch the channel to be used for communication with the printer to the Wi-Fi® system as depicted in FIG. 5C. The display screens depicted in FIGS. 5B, 5D, and 5E may correspond to the display screens depicted in FIGS. 4B, 4D, and 4E, respectively.

In step S12 in FIG. 3, when the CPU 14 determines that a printer has been specified (e.g., YES in step S12), the CPU 14 may determine whether the Wi-Fi® system has been specified as the communication channel to be used for communication with the printer (e.g., step S24). When the CPU 14 determines that the Wi-Fi® system has been specified (e.g., YES in step S24), the CPU 14 may perform appropriate processing in steps S14 to step S22. This situation is illustrated in FIGS. 6A to 6E. As depicted in FIG. 6A, when the selection support field 30 corresponding to Wi-Fi® communication is selected under a condition in which the printer configured to perform communication using the Wi-Fi® system has been specified, a screen displaying one or more candidates for the Wi-Fi® printer to be used (see FIG. 6B) may prompt the user to select a Wi-Fi® printer to be used. The display screens depicted in FIGS. 6C, 6D, and 6E may correspond to the display screens depicted in FIGS. 4C, 4D, and 4E, respectively.

In step S24 in FIG. 3, when the CPU 14 determines that the Wi-Fi® system has not been specified as the channel to be used for communication with the printer (e.g., NO in step S24), the CPU 14 may switch the channel to be used for communication with the printer to the Wi-Fi® system (e.g., step S26). When the switching of the channel to be used for communication to the Wi-Fi® system is performed, information indicating that the Wi-Fi® is the communication channel to be used for communication with the printer may be stored in the memory 16. Thus, thereafter, when an operation for performing communication with the printer is again performed after communication is performed with the printer and ended once, the Wi-Fi® system may be specified as the communication channel to be used for communication with the printer, as a default setting.

FIGS. 7A and 7B illustrate a situation in which the CPU 14 determines, in step S24, that the Wi-Fi® system has not been specified. For example, when an operation for selecting the selection support field 30 corresponding to the selection support field 30 is performed on the screen depicted in FIG. 7a under a condition where the selection support field 32 corresponding to Bluetooth® communication has been selected first, the communication channel to be used for communication with the printer may be switched to the Wi-Fi® system (see FIG. 7B).

When the processing of steps S22 and S26 in FIG. 3 have been completed or when the CPU 14 determines, in step S10, that an input to the selection support field 30 corresponding to the Wi-Fi® system has not been detected (e.g., NO in step S10), the CPU 14 may end the Wi-Fi® communication support process once.

FIG. 8 illustrates a Bluetooth® communication support process according to the illustrative embodiment. The Bluetooth® communication support process may be implemented by which the communication support program 16a stored in the memory 16 may be repeatedly performed by the CPU 14, for example, at predetermined intervals. The Bluetooth® communication support process depicted in FIG. 8 may be performed concurrently with the Wi-Fi® communication support process depicted in FIG. 3.

In step S30, the CPU 14 may determine whether an input to the selection support field 32 corresponding to Bluetooth® communication has been detected. When the CPU 14 determines that an input to the selection support field 32 corresponding to Bluetooth® communication has been detected (e.g., YES in step S30), the CPU 14 may determine whether a Bluetooth® printer to be used for communication with the mobile telephone device 10 has already been specified (e.g., step S32). When the CPU 14 determines that a Bluetooth® printer to be used for communication with the mobile telephone device 10 has not been specified yet (e.g., NO in step S32), the CPU 14 may determine whether a communication function using the Bluetooth® system (hereinafter, also referred to as a "Bluetooth® communication function") is enabled (e.g., step S34). When the CPU 14 determines that the Bluetooth® communication function is not enabled (e.g., NO in step S34), the CPU 14 may display, on the LCD 22b, a Bluetooth® specifying screen for enabling the Bluetooth® communication function (e.g., step S36).

A situation as described above with respect to FIG. 8 is further illustrated by way of example interfaces as shown in FIGS. 9A and 9D. For example, when the Bluetooth® communication function is disabled at the time of the selection of the selection support field 32 as depicted in FIG.

9A, the screen may be switched to the Bluetooth® specifying screen depicted in FIG. 9D to prompt the user to enable the Bluetooth® communication function. In response this switch to the screen of FIG. 9D, the user may operate the touch panel 22a in accordance with guidance displayed on the Bluetooth® specifying screen to enable the Bluetooth® communication function.

After the CPU 14 displays the Bluetooth® specifying screen, the CPU 14 may wait until the Bluetooth® communication function becomes enabled by the user's operation for instructing the performance of communication using the Bluetooth® system through processing in steps S34 and S36 in FIG. 8. When the CPU 14 determines that the Bluetooth® communication function has become enabled by the user's operation (e.g., YES in step S34), the routine may proceed to step S38.

The CPU 14 may display a Bluetooth® printer selection screen (e.g., in step S38). As depicted in FIG. 9B, the CPU 14 may display, on the LCD 22b, Bluetooth® printer fields 38a, 38b, and 38c corresponding to communicable Bluetooth® printers that may be candidates for a printer to be communicated with the mobile telephone device 10, respectively. Nevertheless, for the Bluetooth® case, one or more printers that may be paired with the mobile telephone device 10 and registered by the OS may be listed. Therefore, in some configurations, one or more incommunicable printers may also be displayed. In cases where it may be desired to specify another Bluetooth® printer different from the one or more listed Bluetooth® printers, a link to another screen for adding a new Bluetooth® printer may be provided on the Bluetooth® printer selection screen.

When the user performs an input operation for selecting one of the Bluetooth® printer fields 38a, 38b, and 38c, in step S40 in FIG. 9, the CPU 14 may determine that a printer has been selected (e.g., YES in step S40) and the routine may proceed to step S42. The CPU 14 may specify the selected printer as the communication-target printer to be used for communication using the Bluetooth® system and display the "Print Settings" screen as depicted in FIG. 9C (e.g., step S42).

FIG. 9A illustrates a situation in which no printer has yet been specified. Therefore, the indication representing that a Bluetooth® printer has not been specified yet, for example, a message "No Device selected", may be displayed in the selection support field 32. When a Bluetooth® has been specified, the name of the specified Bluetooth® printer (e.g., "Bu P-1") may be displayed as shown in FIG. 9C.

As depicted in FIG. 10A, when the Wi-Fi® system has been specified as the communication channel for communication with the printer at the time of the selection of the selection support field 32 corresponding to Bluetooth® communication, in step S42, the CPU 14 may specify the selected Bluetooth® printer as the communication-target printer and then switch the channel to be used for communication with the printer to the Bluetooth® system as depicted in FIG. 10C. The display screens depicted in FIGS. 10B and 10D may correspond to the display screens depicted in FIGS. 9B and 9D, respectively.

In step S32 in FIG. 8, the CPU 14 determines that a printer has been specified (e.g., YES in step S32), the CPU 14 may determine whether the Bluetooth® system has been specified as the communication channel to be used for communication with the printer (e.g., step S44). When the CPU 14 determines that the Bluetooth® system has been specified (e.g., YES in step S44), the CPU 14 may perform appropriate processing (e.g., steps S34 to S42). This situation is illustrated in FIGS. 11A to 11D. As depicted in FIG. 11A, when the selection support field 32 corresponding to Bluetooth® communication is selected under a condition where the printer configured to perform communication using the Bluetooth® system has been specified, a screen displaying one or more candidates for the Bluetooth® printer (see FIG. 11B) may prompt the user to select a Bluetooth® printer to be used. The display screens depicted in FIGS. 11C and 11D may correspond to the display screens depicted in FIGS. 9C and 9D, respectively.

In step S44 in FIG. 8, when the CPU 14 determines that the Bluetooth® system has not been specified as the channel to be used for communication with the printer (e.g., NO in step S44), the CPU 14 may switch the channel to be used for communication with the printer to the Bluetooth® system (e.g., step S46). When the switching of the channel to be used for communication to the Bluetooth® system is performed, information indicating the Bluetooth® system as the communication channel to be used for communication with the printer may be stored in the memory 16. Thus, thereafter, when an operation for performing communication with the printer is again performed after communication is performed with the printer and ended once, the Bluetooth® may be specified as the communication channel to be used for communication with the printer, as the default setting.

When the processing of steps S42 and S46 have been completed or when the CPU 14 determines, in step S30, that an input to the selection support field 32 corresponding to the Bluetooth® system has not been detected (e.g., NO in step S30), the CPU 14 may end the Bluetooth® communication support process once.

According to the above-described illustrative embodiment, the following effects may be obtained.

When the Wi-Fi® system has been specified as the communication channel to be used at the time of the input operation to the selection support field 30 corresponding to Wi-Fi® communication (e.g., YES in step S24), the CPU 14 may allow the user to specify the Wi-Fi® printer to be used. Similarly, when the Bluetooth® system has been specified as the communication channel to be used at the time of the input operation to the selection support field 32 corresponding to Bluetooth® communication (e.g., YES in step S44), the CPU 14 may allow the user to specify the Bluetooth® printer to be used. With this configuration, the operation for specifying the printer to be used may be implemented by the operation for selecting one of the selection support fields 30 and 32 to switch the channel to be used for communication between the Wi-Fi® system and the Bluetooth® system from one to another. Therefore, the input operation to the input unit may be facilitated.

The CPU 14 may place a mark on one selection support field, corresponding to the channel currently specified as the channel to be used for communication, of the selection support fields 30 and 32, while the selection support fields 30 and 32 are listed in a column. Since the selection support fields 30 and 32 are listed in the column, the user may readily recognize that the channel is specified as the channel to be used for communication in the state where the communication channel and the printer may be allowed to be specified.

The CPU 14 may list the one or more candidates for the Wi-Fi® printer to be used for communication on the Wi-Fi® printer selection screen (e.g., FIG. 4B) and may list the one or more candidates for the Bluetooth® printer to be used for communication on the Bluetooth® printer selection screen (e.g., FIG. 9B). With this configuration, the user may readily recognize the candidates for the printer to be used for communication. Therefore, the user may readily select a desired printer to be used for communication.

The CPU 14 may display the one or more candidates for the printer to be used for communication on condition that the communication function becomes enabled (e.g., step S14 or S34). With this configuration, the communication function may be enabled when the printer to be used for communication is specified.

When the Wi-Fi® printer to be used for communication has been specified, the CPU 14 may display the name of the Wi-Fi® printer in the selection support field 30 (e.g., FIG. 4C). When the Bluetooth® printer to be used for communication has been specified, the CPU 14 may display the name of the Bluetooth® printer in the selection support field 32 (e.g., FIG. 9C). Therefore, the user may grasp or identify, at once, the printer to be used for communication using the specified channel when one of the Wi-Fi® system and the Bluetooth® system is specified as the channel to be used for communication in the state where both of the selection support fields 30 and 32 may be displayed and the channel to be used for communication and the printer may be allowed to be specified.

When the Wi-Fi® printer to be used for communication has not been specified, the CPU 14 may provide the indication representing that a Wi-Fi® printer to be used for communication has not been specified, in the selection support field 30. When the Bluetooth® printer to be used for communication has not been specified, the CPU 14 may provide the indication representing that a Bluetooth® printer to be used for communication has not been specified, in the selection support field 32 (e.g., FIG. 2). Therefore, when the printers corresponding to the respective communication channels have not been specified in the state where both of the selection support fields 30 and 32 are displayed and the channel to be used for communication and the printer is allowed to be specified, the user may readily grasp the current state.

When the Wi-Fi® printer to be used for communication has not been specified, the CPU 14 may switch the screen to the Wi-Fi® printer selection screen in response to the input operation to the selection support field 30, regardless of whether the Wi-Fi® system has been specified as the channel to be used for communication (e.g. NO in step S12). Similarly, when the Bluetooth® printer to be used for communication has not been specified, the CPU 14 may switch the screen to the Bluetooth® printer selection screen in response to the input operation to the selection support field 32, regardless of whether the Bluetooth® system has been specified as the channel to be used for communication (e.g. NO in step S32). With this configuration, the user may avoid performing a further input operation for specifying the printer as compared with a case where only the processing of switching the communication channel may be performed when one selection support, corresponding to the channel that has not been specified as the channel to be used for communication, of the selection support fields 30 and 32, is selected.

Other Embodiments

While the disclosure has been described in detail with reference to the specific embodiments thereof, they are merely examples, and various changes, arrangements and modifications may be applied therein without departing from the spirit and scope of the disclosure. The above-described illustrative embodiment may be varied by which part or some of the configurations that other embodiments may comprise may be added to the above-described illustrative embodiment or may be replaced with part or some of the configurations that the above-described illustrative embodiment may comprise. Other embodiments are described as example variations of the illustrative embodiment.

In the above-described illustrative embodiment, the channel specifying function might not necessarily always specify one of the communication channels as a selected communication channel. In other embodiments, for example, no channel may be specified in an initial state because there is no memory of the previous printer specification. In this case, for example, no mark may be placed on either of the selection support fields of the communication channels.

In the above-described illustrative embodiments, once the settings are specified, the settings may be stored and maintained unless the stored settings are changed. However, in some arrangements, the maintenance of the settings may depend on an amount of energy stored in the mobile telephone device 10 or might not depend on the amount of energy stored in the mobile telephone device 10. For example, when the amount of energy stored in the mobile telephone device 10 becomes a predetermined amount or less, the specified information may be erased. In this case, it may be unnecessary to store the specification information in the memory (e.g., the nonvolatile memory) that may hold data regardless of the presence or absence of power supply, for example, a flash memory. With this configuration, the storage area requirements of the nonvolatile memory may be reduced.

In the above-described illustrative embodiment, the Bluetooth® system and the Wi-Fi® system are examples of the channels that may be selected for communication with the printer. Nevertheless, the channels might not be limited to Bluetooth® and Wi-Fi®. In other embodiments, for example, a communication channel via infrared rays, a communication channel via a universal serial bus ("USB"), or a communication channel via a wired LAN may be adopted as the channel to be used for communication with the printer. Moreover, the number of communication channels listed on the LCD 22b might not be limited to two. In other embodiments, for example, three or more communication channels may be listed.

If three or more communication channels are listed, all selection support fields corresponding to the three or more communication channels, respectively, might not necessarily be listed on a single selection screen. When a relatively large number of communication channels needs to be listed and each display field of the selection support fields requires a predetermined size or larger for readability, it may be difficult to list all of the selection support fields on the single screen. In this case, the display screen may be allowed to display all the communication channels through a discontinuous change of the display screen from one to another (e.g., the switching of the display screen) or through a continuous change of the display screen at a flick of the touch panel 22a to scroll the display screen. The continuous screen change may be preferable to the discontinuous screen change.

In the above-described illustrative embodiment, a mark may be placed on one of the selection support fields 30 and 32 in accordance with whether the channel has been specified as the communication channel to be used for communication with the external device. Alternatively or additionally, the entire backgrounds of the selection support fields 30 and 32 may be indicated with different colors, respectively.

The method of providing the function of permitting the printer specification on condition that the communication function is enabled might not be limited to the specific embodiment. In other embodiments, for example, when the CPU 14 determines, in step S10, that an input to the selection support field 30 corresponding to the Wi-Fi® system, the CPU 14 may perform an appropriate one or more of the processing of steps S14 and S16 and then perform the processing of step S12. Nevertheless, the above-described method may be modified or differently defined. For example, the CPU 14 may perform an appropriate one or more of the processing of steps S34 and S36 subsequent to the processing of steps S44 and S46 in the Bluetooth® communication support process depicted in FIG. 8.

For example, when an input operation to the selection support field 30 is detected while the Wi-Fi® has not been specified as the channel to be used for communication, only the switching of the channel to be used for communication to the Wi-Fi® system may be performed although the Wi-Fi® printer has not been specified. This processing may be implemented by changing the sequence of steps S12 and S24 in FIG. 3, for example.

The information for identifying the printer might not be limited to the printer name. For example, the user may assign an arbitrary number to the printer and the assigned number of the printer may be displayed as the information for identifying the printer.

The user interface might not be limited to the user interface configured with the LCD 22*b* and the touch panel 22*a* placed next to or near one another. In other embodiments, for example, a display unit and an input unit may be disposed in different areas, respectively, in plain view.

In the above-described illustrative embodiments, a printer may be taken as an example of the external device as the communication target. Nevertheless, the communication-target device might not be limited to the printer. In other embodiments, for example, the communication-target device may be a scanner, a multifunction device, a personal computer, or another mobile telephone device. In short, the communication-target device may be any device that may be allowed to perform communication with the mobile telephone device 10.

In the above-described illustrative embodiments, the mobile telephone device 10 may be taken as an example of the communication device. Nevertheless, the communication device might not be limited to the mobile telephone device 10. In other embodiments, for example, the communication device may be a tablet terminal not having a telephone function or a personal computer.

Some or all of the functions of the application program may be performed by special hardware, instead of software.

What is claimed is:

1. A non-transitory computer-readable storage medium storing instructions therein, the instructions, when executed, causing a communication device to perform steps comprising:
generating, for display on a display unit, a channel selection screen for selecting a communication channel, from a plurality of communication channels, to be used for external device communication;
determining whether a first communication channel, of the plurality of communication channels displayed in the channel selection screen, has already been selected, prior to generating the channel selection screen, as the communication channel for external device communication;
receiving a selection of the first communication channel through the generated channel selection screen;
generating, for display on the display unit, a device specification screen configured to receive user specification of an external device to be used for external device communication with the communication device using the first communication channel in response to determining that a first set of conditions is satisfied, the first set of conditions comprising:
determining that the first communication channel has already been selected, prior to generating the channel selection screen, as the communication channel for external device communication, and
determining that the first communication channel is currently selected through the generated channel selection screen; and
specifying the first communication channel as the communication channel to be used for external device communication, without generating the device specification screen, in response to determining that a second set of conditions is satisfied, the second set of conditions comprising:
determining that the first communication channel was not already selected, prior to generating the channel selection screen, as the communication channel for external device communication, and
determining that the first communication channel is currently selected through the generated channel selection screen.

2. The computer-readable storage medium according to claim 1,
wherein generating the channel selection screen includes:
generating selection support fields in the channel selection screen, the selection support fields corresponding to the first communication channel and a second communication channel, respectively; and
generating the selection support field selected as the communication channel to be used for external device communication in a manner different from the other selection support field that is not selected as the communication channel to be used for external device communication.

3. The computer-readable storage medium according to claim 2,
wherein the first communication channel uses a Wi-Fi system, and
wherein the second communication channel uses a Bluetooth system.

4. The computer-readable storage medium according to claim 1,
wherein generating the device specification screen includes:
adding, to the device specification screen, a candidate external device using the first communication channel; and
wherein the instructions, when executed, further cause the communication device to perform:
specifying the candidate external device as the external device to be used for external device communication using the first communication channel.

5. The computer-readable storage medium according to claim 1,
wherein the instructions, when executed, further cause the communication device to perform:
determining whether a communication function using the first communication channel is enabled in response to determining that the first set of conditions is satisfied; and specifying the external device for external device communication using the first communication channel on condition that the communication function becomes enabled, in response to determining that the communication function using the first communication channel is disabled.

6. The computer-readable storage medium according to claim 5,
wherein the instructions, when executed, further cause the communication device to perform:
generating, in response to determining that the communication function using the first communication channel is disabled, a switching screen for enabling the communication function using the first communication channel.

7. The computer-readable storage medium according to claim 1,
wherein the instructions, when executed, further cause the communication device to perform:
in response to a selection of the external device for external device communication, generating another channel selection screen including a name of the selected external device.

8. The computer-readable storage medium according to claim 1,
wherein the instructions, when executed, further cause the communication device to perform:
adding, to the channel selection screen, an indication representing that a communication target device has not been specified when the external device for external device communication has not been specified.

9. The computer-readable storage medium according to claim 1,
wherein the instructions, when executed, further cause the communication device to perform:
determining whether the external device to be used for external device communication using the first communication channel has been previously specified; and
specifying the first communication channel as the communication channel for external device communication upon the external device to be used for external device communication using the first communication channel being specified in response to determining that the first communication channel is selected through the channel selection screen and determining that the external device to be used for external device communication using the first communication channel has not been previously specified,
wherein the first and second sets of conditions further include:
determining that the external device to be used for external device communication using the first communication channel has been previously specified.

10. The computer-readable storage medium according to claim 9,
wherein the instructions, when executed, further cause the communication device to perform:
generating the device specification screen to include a candidate external device to be used for external device communication using the first communication channel in response to determining that the first communication channel is selected through the channel selection screen and determining that the external device to be used for external device communication with using the first communication channel has not been previously specified; and
specifying the candidate external device as the external device to be used for external device communication using the first communication channel.

11. A communication device comprising:
a processor; and
memory storing instructions therein, the instructions, when executed by the processor, causing the communication device to perform steps comprising:
generating, for display on a display unit, a channel selection screen for selecting a communication channel, from a plurality of communication channels, to be used for external device communication;
determining whether a first communication channel, of the plurality of communication channels displayed in the channel selection screen, has already been selected, prior to generating the channel selection screen, as the communication channel for external device communication;
receiving a selection of the first communication channel through the channel selection screen;
generating, for display on the display unit, a device specification screen configured to receive user specification of an external device to be used for external device communication with the communication device using the first communication channel in response to determining that a first set of conditions is satisfied, the first set of conditions comprising:
determining that the first communication channel has already been selected, prior to generating the channel selection screen, as the communication channel for external device communication, and
determining that the first communication channel is selected through the generated channel selection screen; and
specifying the first communication channel as the communication channel to be used for external device communication, without generating the device specification screen, in response to determining that a second set of conditions is satisfied, the second set of conditions comprising:
determining that the first communication channel was not already selected prior to generating the channel selection screen, as the communication channel for external device communication, and
determining that the first communication channel is selected through the generated channel selection screen.

* * * * *

UNITED STATES PATENT AND TRADEMARK OFFICE
CERTIFICATE OF CORRECTION

PATENT NO. : 9,699,720 B2
APPLICATION NO. : 14/159061
DATED : July 4, 2017
INVENTOR(S) : Norihiko Asai It is certified that error appears in the above-identified patent and that said Letters Patent is hereby corrected as shown below:

In the Claims

In Column 14, Claim 11, Line 53:
Please delete "selected" and insert --selected,--

Signed and Sealed this
Twentieth Day of February, 2018

Andrei Iancu
*Director of the United States Patent and Trademark Office*